Figure 1:
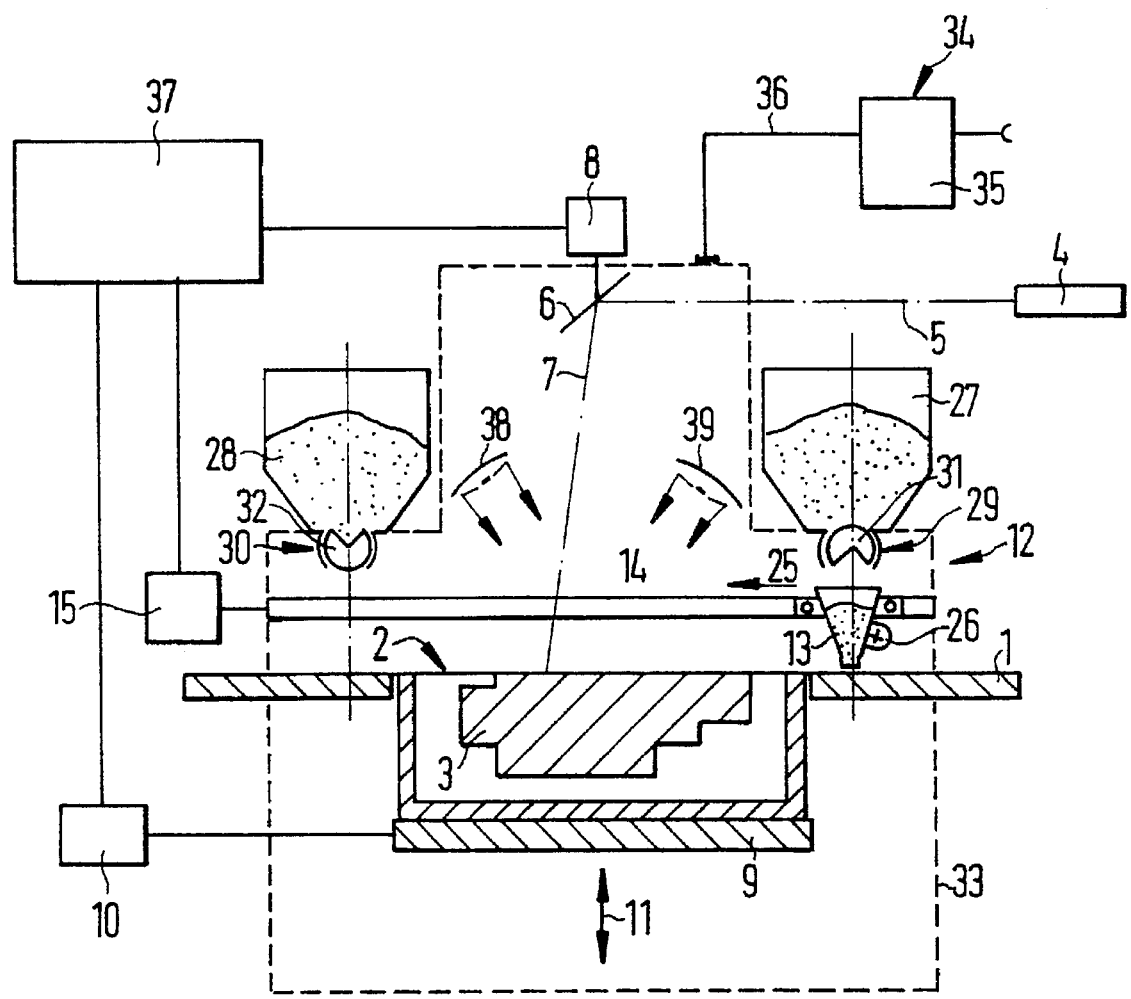

United States Patent [19]
Retallick et al.

[11] Patent Number: 5,647,931
[45] Date of Patent: Jul. 15, 1997

[54] METHOD AND APPARATUS FOR PRODUCING A THREE-DIMENSIONAL OBJECT

[75] Inventors: David Retallick, Münsterhausen; Hans J. Langer, Gräfelfing, both of Germany

[73] Assignee: EOS GmbH Electro Optical Systems, Planegg, Germany

[21] Appl. No.: 507,516

[22] PCT Filed: Dec. 19, 1994

[86] PCT No.: PCT/EP94/04214

§ 371 Date: Aug. 22, 1995

§ 102(e) Date: Aug. 22, 1995

[87] PCT Pub. No.: WO95/18715

PCT Pub. Date: Jul. 13, 1995

[30] Foreign Application Priority Data

Jan. 11, 1994 [DE] Germany ............... 44 00 523.7

[51] Int. Cl.$^6$ ............................................. B32B 31/00
[52] U.S. Cl. ............... 156/73.6; 156/273.3; 156/273.5; 156/275.5; 156/379.8; 156/381; 264/69; 264/85; 264/125; 264/308; 425/174.4
[58] Field of Search ............... 156/272.2, 273.3, 156/273.5, 275.5, 290, 329.6, 379.8, 73.6, 381, 382; 264/69, 109, 123, 308, 401, 402, 85, 125; 222/185.1, 368, 410, 413, 414; 425/174.4

[56] References Cited

U.S. PATENT DOCUMENTS

| | | |
|---|---|---|
| 4,323,756 | 4/1982 | Brown et al. ............... 219/121 LF |
| 4,863,538 | 9/1989 | Deckard ............... 156/62.2 |
| 5,037,014 | 8/1991 | Bliss ............... 222/410 |
| 5,387,380 | 2/1995 | Cima et al. ............... 264/69 |

FOREIGN PATENT DOCUMENTS

| | | |
|---|---|---|
| 0431924A2 | 6/1991 | European Pat. Off. . |
| 0450762A1 | 10/1991 | European Pat. Off. . |
| 1156865 | 11/1963 | Germany . |
| 9400372 | 5/1994 | Germany . |
| 9319567.2 | 6/1994 | Germany . |
| 4326986C1 | 12/1994 | Germany . |
| 9003893 | 4/1990 | WIPO . |
| WO92/08592 | 5/1992 | WIPO . |
| 9308928 | 5/1993 | WIPO . |
| 9325336 | 12/1993 | WIPO . |

OTHER PUBLICATIONS

Partial translation of the office action dated Jul. 3, 1995, concerning the German Patent Application P 44 00 523.7–16 and partial translation of DE 43 26 986 C1.
Partial translation of DE U 94 00 372.6.

*Primary Examiner*—James Sells
*Attorney, Agent, or Firm*—George W. Neuner

[57] ABSTRACT

In a method and an apparatus for producing three-dimensional objects by layerwise solidification of a material the problem is encountered that, in particular when using powdery or pasty material, a material layer having an exactly adjusted thickness can not be generated in a sufficiently fast manner. In order to solve this problem, it is proposed to scrape the material by means of a vibrating wiper member (21, 22) when applying the material or to provide a movable container (13) used for applying the material with such wiper members (21, 22) at the lower side thereof.

34 Claims, 2 Drawing Sheets

METHOD AND APPARATUS FOR PRODUCING A THREE-DIMENSIONAL OBJECT

The invention relates to a method and an apparatus for producing a three-dimensional object according to the preamble of claim 1 or claim 10, resp.

A method and an apparatus of this kind is disclosed for example in U.S. Pat. No. 4,863,538. A predetermined amount of a powdery material is charged onto a lowerable platform and distributed thereon by means of a rotating drum which is moved across the platform. Thereafter the distributed material is irradiated at those portions of the thus formed material layer to thereby sinter together the material thereat. However, this manner of applying material is not optimal as regards the speed of applying material and the accuracy in obtaining a certain thickness of the material.

A method for producing a three-dimensional object according to the preamble of claim 1 is known from EP 0 450 762 A1. A uniform layer thickness is obtained by smoothing the applied material by means of a doctor blade.

In connection with a method for producing a three-dimensional object using solidifiable powderous material it is known from EP 0 431 924 A2 to generate a desired compactness of the powdery particles by means of a vibrating wiper. The wiper vibrates in a direction perpendicular to the surface of the powder layer.

It is the object of the invention to improve the known method or the known apparatus, resp., so that the application of the material and the adjustment of the layer thickness of the applied material are accelerated and improved.

According to the invention this object is achieved by a method having the features of claim 1 and by a device having the features of claim 10, resp.

Further developments of the invention are defined in the subclaims.

Figure 2:
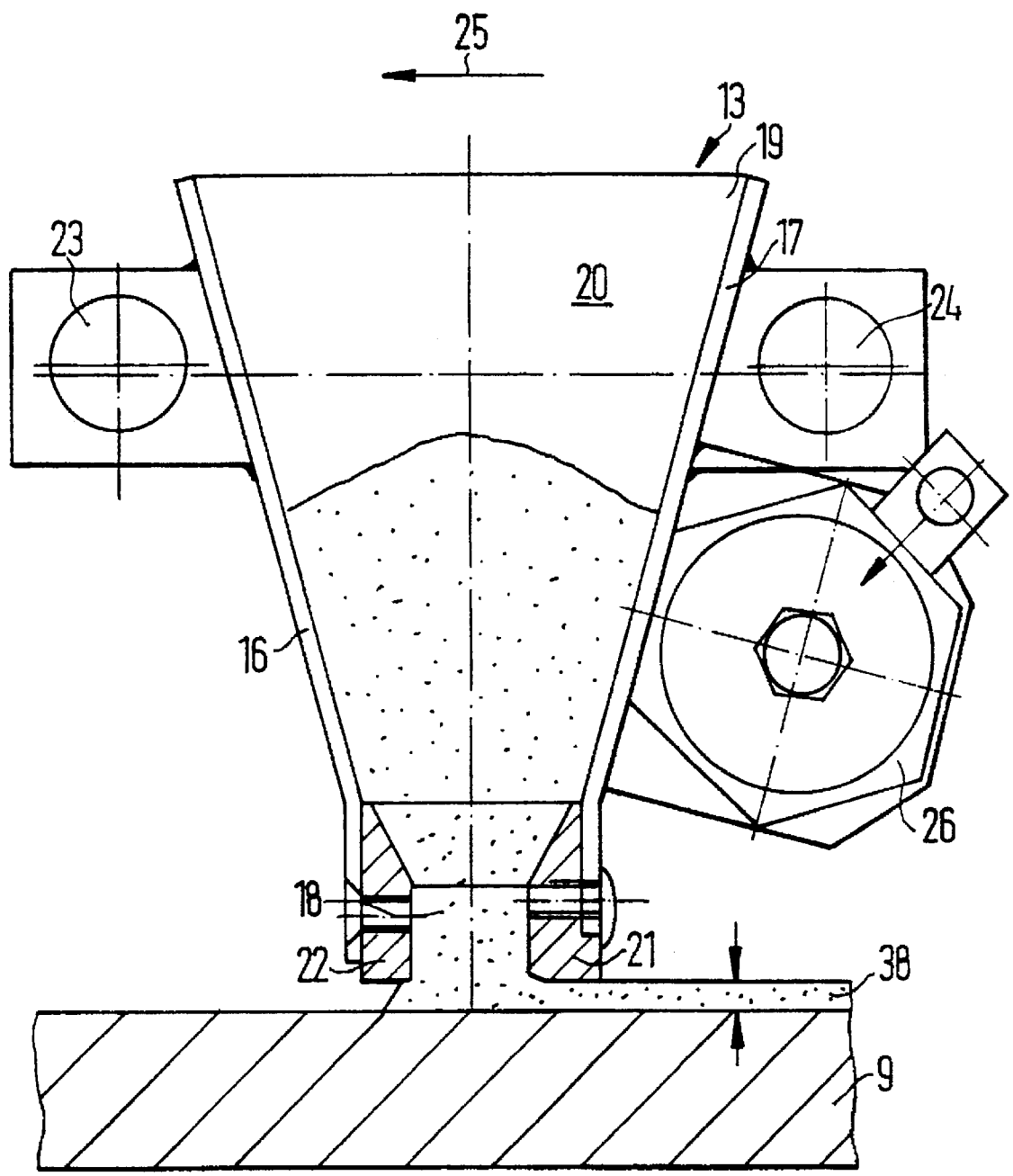

In the following an embodiment of the invention will be described with reference to the Figures. In the Figures:

FIG. 1 is a schematic side view of the apparatus according to the invention; and FIG. 2 is an enlarged sectional view of the applying device according to the invention.

The apparatus comprises a substantially horizontal work table 1 having a hole in the form of a cutout 2. The cross-section of the cutout 2 is larger than the maximum cross-section of the object 3 to be produced. An irradiation device 4, for example a laser, emitting a focussed light beam 5 is disposed above a work table. The light beam is deflected as a deflected beam 7 onto the plane of the work table by means of a deflection device 6. A deflection control 8 controls the deflection device so that the deflected beam 7 strikes any desired point within the operating region defined by the cutout 2.

A substantially flat platform 9 has a shape corresponding to the cutout 2 and can be lowered by means of a schematically indicated level adjustment device 10 in direction of arrow 11 during production of the object from an uppermost position in which the surface of the platform 9 is within the cutout 2 and substantially level with the surface of the work table 1 by such a distance that the finished object 3 can be removed below the work table 1, as described further below.

An applying device 12 for applying the material to be solidified onto the work table 1 and onto the platform 9 is disposed above the work table. As shown in more detail in FIG. 2 the applying device comprises a container 13 being designed as a trough which extends transversely across the cutout 2 or the platform 9, resp., and can be displaced by means of a displacement drive 15 along guides 14 substantially transversely to the extension thereof across the cutout 2 or the platform 9, resp., from a first end position shown in FIG. 1 with the container 13 being on one side of the cutout 2 outside thereof to a second substantially symmetric end position with the container 13 being on the other side of the cutout 2 ouside thereof.

The container 13 has a substantially funnel-shaped cross-section which is defined by two sidewalls 16, 17 and flares outwardly from a narrow slit-shaped lower opening 18 to a wider upper opening 19. The upper and lower openings 18, 19 each extend across substantially the entire length of the container 13 to thereby form, together with the interior space 20 defined by the sidewalls, a downwardly narrowing channel having a length which substantially corresponds to the dimension of the cutout 2 or of the platform 9, resp.

Wiper members 21, 22 extending parallel to the work table 1 along substantially the entire length of the lower opening are fastened to the lower edges of the sidewalls 16, 17 facing the work table 1. The spacing between the lower edge of the wiper member 21, 22 forming a wiping edge and the work table or the platform 9 in the uppermost position thereof, resp., is adjusted or adjustable to be just enough for the container 13 to be displaced without contacting the work table 1 or having a minor friction only.

Cross guides 23, 24 shown in FIG. 2 support the container while allowing a displacement in direction of the longitudinal extension thereof or transversely to the displacement direction 25, resp. Elastic members (not shown), for example springs, are provided to support the container resiliently deflectably from a normal position thereof. A vibrating device 26, for example an electric or hydraulic vibrator, is mounted to a sidewall 17 or to a further part of the container 13 and formed to vibrate the container 13 in cooperation with the elastic members with an oscillation in direction of the lower opening and of the wiper members, i.e. transversely to the displacement direction 25 and parallel to the plane of the work table 1 or of the platform 9, resp.

A corresponding reservoir 27, 28 for the material to be solidified and a feeding device 29, 30 provided at the lower end thereof are disposed above the two end positions of the container 13 or the upper opening 19 thereof, resp., as shown in FIG. 1. Each feeding device 29, 30 is formed as a drum which rotates around a horizontal axis lying above the plane of displacement of the container 13 and parallel to the extension thereof and which has, at the periphery thereof, a groove of notch configuration (notched drum) which can be rotated by means of a drive (not shown) by about 180° from a first position shown in FIG. 1 on the left-hand side whereby the notched groove opens upwardly and connects with the interior space of the reservoir 28 to a discharge position shown in FIG. 1 on the right-hand side whereby the notched groove opens downwardly and opposes the upper opening 19 of the container.

The work table 1, the platform 9 and the applying device 12 are surrounded by a thermally insulated housing 33 which is indicated in dotted lines in FIG. 1 and connected with an inert gas supply 34. Preferably the inert gas is nitrogen which is produced from air by means of a (per se known) membrane separating device 35 and fed into the housing 33 through a feed conduit 36. Preferably the feed conduit 36 is passed over further parts for cooling thereof, such as the irradiation device 4, the deflection device 6 and the deflection control 8 before feeding it to the housing.

Finally, a radiant heating device 38, 39 directed to the cutout 2 and a central control unit 37 are provided, the control unit 37 being connected with the level adjustment device 10, the deflection control 8 and the displacement drive 15 for carrying out the steps which will subsequently be described.

In operation the reservoirs 27, 28 are first filled with a material which is suitable for the production of the object, for example a plastic powder, a metal powder or ceramic powder or a blend, i.e. for example a plastic-coated metal or ceramic powder. By means of the level adjustment device 10 the platform 9 is raised into the uppermost position whereby the surface of the platform 9 is level with the surface of the work table 1 and thereafter lowered by an amount corresponding to the predetermined thickness of the first material layer to form within the cutout 2 a depressed region which is defined laterally by the walls of the cutout 2 and at the bottom by the platform 9. Using the displacement drive 15 the applying device 12 is moved to the start position thereof whereby the container 13 is positioned below the feeding device 29 or the drum 31, resp. Furthermore, the inert gas supply 34 feeds for example nitrogen into the housing 33 until a desired inert gas atmosphere is obtained therein.

By rotating the drum 29 once or several times a predetermined volume of the material corresponding to the single or multiple volume of the groove in the drum 29 is filled from the reservoir 27 into the container 13 through the upper opening 19 being underneath the drum 29. Thereupon the displacement drive 15 moves the container 13 in displacement direction 25 across the cutout 2 to the other end position shown in FIG. 1 on the left-hand side whereby the container 13 stands underneath the other feeding device 30. During this movement the vibration device 26 is operated which oscillates the container in a direction transversely to the displacement direction 25 and parallel to the platform 9. This vibration prevents an agglomeration of the powder in the container and guarantees a free flow of the 10 material out of the lower opening 18 onto the platform 9. At the same time a compression of the applied material can be obtained by means of this vibrating movement.

The application of the material onto the platform 9 is shown in more detail in FIG. 2. The material flowing out of the lower opening 18 when moving the container 13 in direction 25 (in direction to the left in FIG. 2) is adjusted and scraped off to the desired layer thickness s by the trailing wiper member 21 (the wiper member on the right in FIG. 2) so as to obtain a layer 38 having a defined thickness s. Owing to the fact that the wiper member 21 is fastened to the container 13 the wiper member 21 vibrates together with the container 13 in a direction transversely to the displacement direction 25 and parallel to the platform 9. This oscillation of the wiper member 21 considerably improves the precision in adjusting the layer thickness s and the surface quality of the layer 38.

After applying and scraping the layer 38 and preheating the material in the layer 38 by means of the radiant heater 38, 39 to a suitable operating temperature the control unit 37 controls the deflection device 6 through the control 8 thereof in such a manner that the deflected light beam 7 strikes all desired points of the layer 38 (the points corresponding to the object at this layer) in succession and solidifies the powdery material thereat by sintering.

In a second step the level adjustment device 10 lowers the platform by an amount corresponding to the thickness of the next layer and the container 13 is again filled through the second feeding device 30 by rotating drum 32. Thereupon the next layer is applied by moving the container opposite to the direction 25 while vibrating the same, whereby the layer is now scraped by the other wiper member (the left wiper member in FIG. 2). The layer is then solidified in the same manner as layer 38.

Further layers are applied, scraped and solidified in corresponding manner, whereby for successive layers the container 13 is alternately moved from the left to the right and vice versa while vibrating the same. However, it is also possible to return to the start position after moving the container twice across the platform 9, and a single reservoir and a single applying device are sufficient in this case.

A low material consumption is obtained by the fact that the spacing between the lower opening 18 or the wiper members 21, 22, resp., and the surface of the work table 1 is just enough for the friction to be negligible when moving the container 13 and for the material to be restricted from flowing out between the wiper members 21, 22 and the work table 1. Thus, the material is only applied to the platform 9 which is lowered with respect to the work table 1. Preferably the position of the container 13 is adjustable in order to adjust a corresponding suitable spacing.

Further modifications of the invention are possible. For example liquid or pasty material may be used, the preheating may be dispensed with and any radiation source for electromagnetic radiation issuing a directed beam having sufficient energy, such as a light source or an electron beam source, may be used for the irradiation device. After solidifying the layer the position of the platform 9 can be left unchanged in order to apply and solidify a second layer in the same manner which compensates for the shrinkage of the first layer. It is only thereafter that the platform is lowered for applying the next layer. The wiper members 21, 22 may have any suitable rigid or slightly elastic profile and could also be provided with a sharp scraping edge. The cross-section of the container 13 may have any other suitable shape, such as as rectangular shape.

We claim:

1. A method of producing a three-dimensional object layer by layer on a support using a powdery material which can be solidified by irradiation with electromagnetic radiation, said method comprising carrying out the following steps for each layer:

applying a layer of said material to said support or to a preceding layer;

wiping said layer by moving a wiper member across said support to obtain a predetermined thickness of said material, vibrating said wiper member while moving it across said support to accelerate the formation of said layer having said predetermined thickness and to enhance surface smoothness and compactness of said layer, striking said layer with a beam of electromagnetic radiation at those portions of said layer which correspond to said object, thereby fusing said material at said portions of said layer, whereby said step of applying comprises charging a predetermined amount of said material into a container, said container carrying said wiper member, moving said container across said support and vibrating said container while moving it for simultaneously applying and wiping said material.

2. The method of claim 1 comprising subjecting said wiper member to a vibration in a direction transverse to said wiping direction and parallel to said support or said layer.

3. The method of claim 1 comprising vibrating said wiper member with a vibration having a frequency of about 50 to 500 Hertz and an amplitude of about 0.1 to 2 mm.

4. The method of claim 1 comprising vibrating said wiper member with a vibration having a frequency of about 100 to 200 Hertz and an amplitude of about 0.5 to 1 mm.

5. The method of claim 1 comprising applying said material directly ahead of said wiper member while wiping said layer.

6. The method of claim 1 comprising changing said wiping direction after applying a layer.

7. The method of claim 1 comprising applying said material to a level-adjustable support, lowering said support by an amount corresponding to the thickness of the following layer after fusing the preceding layer or holding said support stationary for applying and fusing a second layer.

8. The method of claim 1 comprising producing an inert gas atmosphere and carrying out said applying, wiping, vibrating and fusing steps under said inert gas atmosphere.

9. A method of producing a three-dimensional object layer by layer on a support using a material which can be solidified by irradiating with electromagnetic radiation, said method comprising carrying out the following steps for each layer:
applying a layer of said material to said support or to a preceding layer,
wiping said layer by moving a wiper member across said support to obtain a predetermined thickness of said material,
vibrating said wiper member while moving it across said support by subjecting said wiper member to a vibration in a direction transverse to said wiping direction and parallel to said support or said layer so as to accelerate the formation of said layer having said predetermined thickness and to enhance surface smoothness and compactness of said layer,
striking said layer with a beam of electromagnetic radiation at those portions of said layer which correspond to said object, thereby fusing said material at said portions of said layer.

10. The method of claim 9, further comprising:
generating an inert gas atmosphere in a space surrounding said support, and
carrying out said applying, wiping and striking steps within said inert gas atmosphere.

11. Apparatus for producing a three-dimensional object layer by layer using a powdery material which can be solidified by irradiating it with electromagnetic radiation, said apparatus comprising:
a support means,
means for applying a layer of said material to said support means,
scanning means for irradiating said layer at those portions thereof corresponding to said object,
said applying means comprising a container means disposed above said support means, said container means receiving said material and having a lower side facing said support means,
drive means for moving said container means across said support means substantially parallel thereto,
wiper means for smoothing said layer to a predetermined thickness, said wiper means being disposed at said lower side of said container means and being fastened to said container means, and
vibrating means for vibrating said container means when moving said container means across said support means.

12. The apparatus of claim 11, said container means being formed as a trough extending transversely across said support means, said trough having an upper opening for charging material into said trough and a lower opening for applying said material.

13. The apparatus of claim 12, said trough having a substantially funnel-shaped cross-section.

14. The apparatus of claim 12, said lower opening being formed as a slit extending along said trough.

15. The apparatus of claim 12 comprising two wiper members, one wiper member being arranged in moving direction of said container means ahead of said lower opening and the other wiper member being arranged in moving direction of said container means behind said lower opening.

16. The apparatus of claim 15, said wiper members being formed by edges of said trough at both sides of said slit.

17. The apparatus of claim 11, said drive means comprising means for moving said container means in a first direction across said support means for applying a first layer and wiping said layer by means of said wiper means, and for moving said container after scanning said first layer in a second direction substantially opposite to said first direction for applying and wiping a following layer.

18. The apparatus of claim 11, said drive means comprising means for moving said container means into an end position after applying and wiping said material.

19. The apparatus of claim 18 comprising reservoir means for said material and feeding means for feeding a predetermined amount of said material from reservoir means into said container means, if said container means is in said end position.

20. The apparatus of claim 19, said feeding means being formed as a metering means, preferably a notched drum, arranged between said reservoir means and said container means when said container means is in said end position.

21. The apparatus of claim 19 comprising a corresponding end position with associated reservoir means and feeding means at both sides of said support means in moving direction of said container means.

22. The apparatus in claim 11, said vibrating means comprising an oscillating means vibrating said container means in a direction transverse to the moving direction of said container means and parallel to said layer.

23. The apparatus of claim 22 comprising means for supporting said container means to be resilient in vibrating direction, said oscillating means acting upon said container means.

24. The apparatus of claim 11 comprising a housing which tightly surrounds said support means and said applying means, and an inert gas source for supplying inert gas into said housing.

25. The apparatus of claim 24, said inert gas source being formed as a membrane separation means for separating nitrogen from air.

26. The apparatus of claim 11, further comprising:
housing means tightly surrounding said support means and said applying means, and
an inert gas source for feeding inert gas into said housing.

27. The apparatus of claim 26, said inert gas source being formed as a membrane separation means for separating nitrogen from air.

28. Apparatus for producing a three-dimensional object layer by layer using a material which can be solidified by irradiating it with electromagnetic radiation, said apparatus comprising:
a support means,
means for applying a layer of said material to said support means,
scanning means for irradiating said layer at those portions thereof corresponding to said object, said applying means comprising a container means disposed above said support means, said container means receiving said material and having a lower side facing said support means, drive means for moving said container means across said support means substantially parallel thereto said drive means comprising means for moving said container means into an end position after applying and wiping said material, wiper means smoothing said layer to a predetermined thickness, said wiper means being disposed at said lower side of said container means and being fastened to said container means, and vibrating means for vibrating said container means when moving said container means across said support means, and reservoir means for said material and feeding means for feeding a predetermined amount of said material from said reservoir means into said container means, if said container means is in said end position.

29. The apparatus of claim 28, said feeding means being formed as a metering means, preferably a notched drum, arranged between said reservoir means and said container means when said container means is in said end position.

30. The apparatus of claim 28 comprising a corresponding end position with associated reservoir means and feeding means at both sides of said support means in moving direction of said container means.

31. The apparatus of claim 28, said vibrating means comprising an oscillating means vibrating said container means in a direction transverse to the moving direction of said container means and parallel to said layer.

32. The apparatus of claim 31 comprising means for supporting said container means to be resilient in vibrating direction, said oscillating means acting upon said container means.

33. The apparatus of claim 28 comprising a housing which tightly surrounds said support means and said applying means, and an inert gas source for supplying inert gas into said housing.

34. The apparatus of claim 33, said inert gas source being formed as a membrane separation means for separating nitrogen from air.

* * * * *